ns% United States Patent [19]
Smith, Jr.

[11] 3,799,049
[45] Mar. 26, 1974

[54] APPARATUS FOR PRODUCING SOLUBLE COFFEE CONCENTRATES

[75] Inventor: Horace L. Smith, Jr., Richmond, Va.

[73] Assignee: Smitherm Industries, Inc., Richmond, Va.

[22] Filed: Dec. 6, 1971

[21] Appl. No.: 205,168

Related U.S. Application Data

[62] Division of Ser. No. 97,942, Dec. 14, 1970, Pat. No. 3,672,911.

[52] U.S. Cl.......................... 99/470, 99/471, 99/472, 99/475
[51] Int. Cl. ........ A23f 1/02, A23n 9/04, F26b 5/06
[58] Field of Search ....... 99/65, 68, 71, 199, 236 C, 99/470–476; 34/5

[56] References Cited
UNITED STATES PATENTS

| 3,754,466 | 8/1973 | Taralli | 99/472 X |
| 3,615,667 | 10/1971 | Joffe | 99/68 |
| 3,682,650 | 8/1972 | Easton | 99/199 X |
| 3,684,527 | 8/1972 | Walter | 99/199 X |
| 3,684,532 | 8/1972 | Gottesman | 99/199 |
| 1,903,362 | 4/1933 | McKinnis | 99/65 |
| 3,404,007 | 10/1968 | Muller | 99/199 X |
| 3,620,034 | 11/1971 | Ganiaris | 99/199 X |
| 3,421,901 | 1/1969 | Mahlmann | 99/199 X |
| 3,324,565 | 6/1967 | Smith | 34/5 |

Primary Examiner—Wayne A. Morse, Jr.
Attorney, Agent, or Firm—Strauch, Nolan, Neale, Nies & Kurz

[57] ABSTRACT

The production of a soluble coffee concentrate by roasting green beans, softening and flaking the roasted beans and thereafter extracting the coffee solubles from them, concentrating the extract, and freeze drying the extracted solubles in the concentrate.

10 Claims, 5 Drawing Figures

APPARATUS FOR PRODUCING SOLUBLE COFFEE CONCENTRATES

METHOD AND APPARATUS FOR PRODUCING SOLUBLE COFFEE CONCENTRATES

The present invention relates to novel, improved methods of and apparatus for making soluble coffee concentrates and the like.

This application is a division of application Ser. No. 97,942 filed Dec. 14, 1970 (now U.S. Pat. No. 3,672,911 issued June 27, 1972).

In the conventional, presently employed method of making soluble coffee concentrates (such products are familiarly referred to as "instant coffee," and the same terminology will for the most part be employed herein), green beans are roasted, ground, and fed into extraction columns. Hot water is then circulated through the extraction columns, producing a brew or extract which is concentrated and dried.

That presently available techniques of manufacturing instant coffee are less than completely satisfactory is evident from the continuous high level of research devoted to developing better processes for manufacturing instant coffee. U. S. Pat. Nos. 3,362,835; 3,449,129; 3,458,320; 2,872,323; 2,863,774; 3,373,042; 3,421,901; and 2,970,914 indicate some of the varied avenues this research has followed.

A major disadvantage of this conventional process is that the ground roasted coffee becomes tightly packed in the extraction columns. This requires the use of pressure to force the extraction liquid through the bed of coffee, which compacts the coffee even further. As a consequence, the liquid percolates only slowly through the bed of coffee, and extraction times become quite long. This is decidedly disadvantageous since the quality of coffee solubles deteriorate when they are kept at high temperatures for extended periods of time.

I have found that this problem can be solved by filling the extraction columns with roasted beans which have been flattened to a thin waferlike shape instead of roasted, ground beans. These wafers do not compress or pack together like ground beans, and the extraction liquid can accordingly circulate freely through a bed of such wafers. The extraction process accordingly proceeds rapidly, and degradation of even the most susceptible of the constituents extracted from the coffee beans is therefore avoided.

The initial step in my novel method of producing instant coffee is to roast the green beans of the desired variety or blend. The roasted beans are subjected to a vacuum to remove roasting gases surrounding and absorbed in the pores of the beans. Water heated to a moderate temperature is then forced into the pores of the degasified beans to quench the roast and to soften the beans and thereby increase their plasticity (unless the beans are first degasified, they cannot as a general rule be filled with water to the extent necessary to produce the desired detree of softening or plasticization). The saturated beans are soaked until soft and then fed through the nip between two rotating members to flatten them into the desired waferlike shape.

In this preferred method of treating the roasted beans, some of the solubles in the beans are dissolved or extracted in the liquid in which the beans are softened. This liquid is accordingly preferably circulated through the extraction columns to prevent the loss of these soluble constituents.

As in the conventional process the effluent from the extraction columns in the invention described herein is a strong brew or extract of coffee solubles. This brew is concentrated, typically by spraying it into a cold inert gas to freeze it into small particles and then centrifuging the frozen extract to separate ice crystals from those containing coffee solubles. The frozen concentrate particles are then dried, preferably by freeze drying to minimize deterioration of the coffee solubles.

One important advantage of the novel method of producing instant coffee described herein, suggested above, is that instant coffee of superior quality can be produced. Another advantage is that the extraction step can be more efficiently accomplished than in conventional methods of making such products. Also, since all of the steps in the process are of a continuous as opposed to batch type, production of instant coffee by the techniques described herein is relatively economical.

From the foregoing it will be apparent that one important and primary object of the invention resides in the provision of novel, improved methods of and apparatus for producing instant coffee of superior quality.

Another important and primary objection of the invention resides in the provision of novel, improved methods of and apparatus for producing instant coffee efficiently and economically.

A related and important but more specific object of the invention is the provision of novel, improved methods of and apparatus for producing instant coffee in which the roasted beans are softened and flattened rather than being ground to facilitate the extraction of coffee solubles from the beans and thereby minimize the development of undesirable characteristics in the solubles as they are extracted.

Other important objects and features and further advantages of the invention will become apparent from the appended claims and as the ensuing detailed description and discussion proceeds in conjunction with the accompanying drawing, in which:

Figures 1, 2:
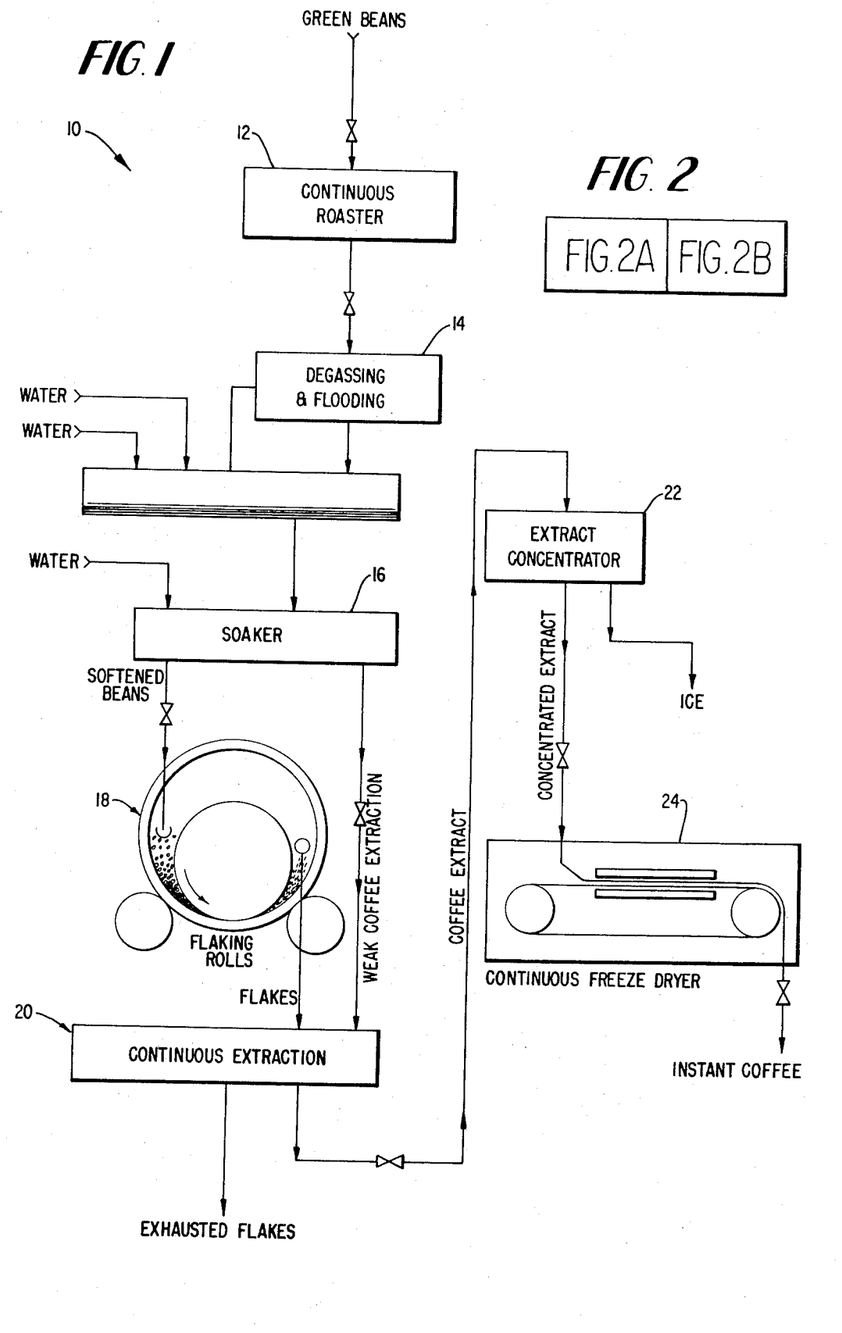
FIG. 1 is a schematic illustration of a plant or system for producing soluble coffee concentrates or instant coffee in accord with the principles of the present invention.
FIG. 2 shows the relationship between FIGS. 2A and 2B which, together, constitute a more detailed, but still generally diagrammatic, illustration of the system shown in FIG. 1.

Referring now to the drawing, FIG. 1 depicts in diagrammatic form apparatus 10 for making instant coffee in accord with the principles of the present invention. The main components or units of system 10 are apparatus 12 for roasting the green coffee beans; a unit 14 in which the roast is quenched and the roasted beans degassed and saturated with heated water to increase their plasticity; and a soaking unit 16 in which the softening process is continued. From the soaking unit, the soft, relatively plastic beans are transferred to a flaking unit 18 where they are passed through the nip between two relatively rotating members to roll or flatten them to a very thin, waferlike configuration.

From flaking unit 18, the thin wafers are transferred to an extraction unit 20 where the coffee solubles are extracted by circulating through the wafers the liquid in which the beans were soaked. The effluent from extraction unit 20 is an extract similar to freshly brewed coffee but of higher concentration. This extract is further concentrated in a unit 22, the discharge from the latter typically being granules of frozen extract. These are fed into a continuous freeze dryer 24 where the coffee solubles are dried to complete the process.

For the most part, the individual components of system 10 are of commercial construction or are described in detail elsewhere in the patent literature. To the extent that this is true, such units will be described in detail herein only to the extent necessary to enable the reader to practice the present invention.

Figure 2A:
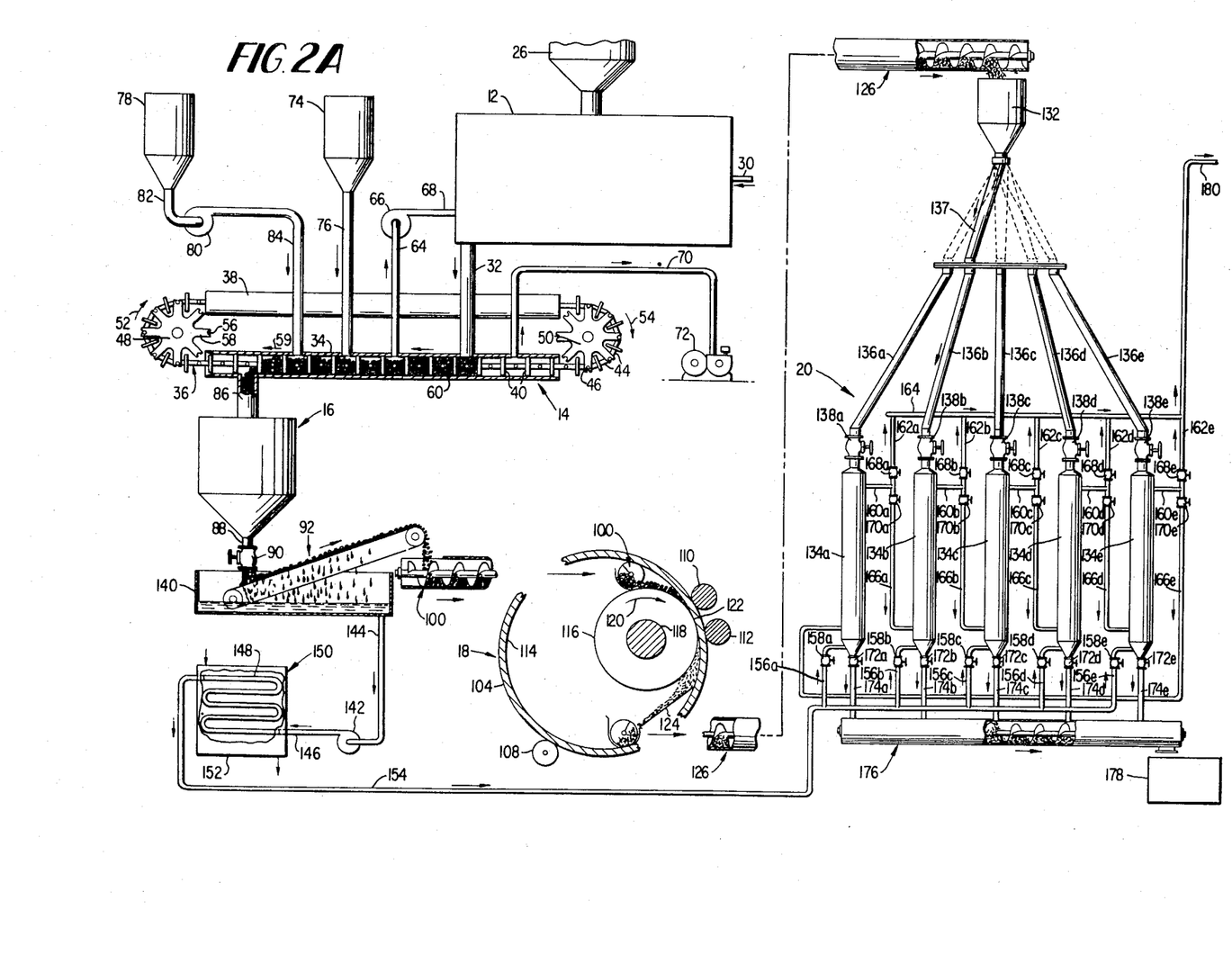

Referring now to FIG. 2A, the green beans or blend of beans from which the instant coffee is to be made are fed from a hopper, bin, or other storage unit 26 into roaster 12, which is preferably of the continuous type disclosed in my co-pending application Ser. No. 44,464 filed June 8, 1970 (now U.S. Pat. No. 3,615,668), which is supplied with a heated, inert roasting gas through conduit 30. Roaster 12 continuously discharges roasted beans into a transfer conduit 32 through which they flow into the unit 14 mentioned above.

This unit is of generally the same construction as the supply and discharge conveyors disclosed in my application Ser. No. 78,809 filed Oct. 7, 1970, and includes an elongated, cylindrical casing 34 through which an endless, flexible chain 36 extends. Chain 36 also extends through an elongated, cylindrical guide 38 disposed in parallel, spaced relation to casing 34.

Fixed to endless chain 36 at substantially equidistantly spaced intervals are pistons 40 which are circular discs or flights configured to engage the inner wall of casing 34. Peripheral seals on flights 40 (not shown) will generally be employed to keep roasting gas from leaking past the seals and thereby keep the inert roasting gas from leaking from and/or air from entering roaster 12.

Preferably, the distance between flights 40 is so related to the length of casing 34 that there are always several pistons in the casing. This provides multiple seals between roaster 12 and the surrounding environment to minimize leakage into the roaster. Also the interior of casing 34 may be coated with Teflon or other material having a low coefficient of friction or otherwise treated to reduce sliding friction between the casing and flights 40.

Belt 36, which consists of links 44 connected by pivot or hinge pins 46, is trained around sprockets 48 and 50 at opposite ends of casing 34. These sprockets are rotated in the direction indicated by arrows 52 and 54 in FIG. 2A by a drive arrangement of appropriate construction (not shown). As the sprockets rotate, the connecting pins 46 of belt 36 are drivingly engaged in recesses 56 at the outer ends of sprocket arms 58. Accordingly, as they revolve, the sprockets propel chain 36 and flights 40 through casing 34 in the direction indicated by arrow 59.

Flights 40 cooperate with casing 34 to form a series of moving, substantially gastight compartments 60. These compartments are filled with the roasted coffee beans discharged from roaster 12 through transfer conduit 32.

As indicated above, one of the steps performed as the coffee is conveyed through casing 34 is the removal of roasting gases surrounding and absorbed in the pores of the roasted coffee from compartments 60. To complete the degasing step, it is necessary to remove from compartments 60 any air which might be in them.

The roasting gases are removed through a conduit 64 connected between the interior of casing 34 and the inlet of a blower or gas pump 66. The outlet of pump 66 is connected by conduit 68 to roaster 12. Accordingly, the roasting gases evacuated from unit 14 are returned to roaster 12, conserving the gases and the sensible heat therein.

Air is evacuated from compartments 60 before they are filled with roasted beans through a vacuum line 70 connected at one end to the interior of casing 34 adjacent the right-hand thereof. The opposite end of vacuum line 70 is connected to a vacuum pump 72 of conventional construction.

As the degassed roasted coffee beans proceed through casing 34, they are flooded with water from a storage tank or other source 74 connected through conduit 76 to the interior of casing 34. To insure that the beans are completely water logged or saturated, they are next preferably contacted with heated water under pressure from a tank or other source 78. The water from source 78 is pumped by pump 80 through conduits 82 and 84 to casing 34; and it may be moderately heated in any desired fashion to speed the plasticization process. Typically, it will be heated to a temperature on the order of 180° F.

Adjacent the left-hand end of casing 34, the saturated or waterlogged roasted beans fall through a transfer conduit 86 into soaking unit 16. This unit will typically be a closed tank of stainless steel or other unreactive material.

The beans are held in tank 16 long enough to complete the softening process and are then transferred by gravity through conduit 88 and valve 90 into the feed end of an inclined, endless conveyor 92. From conveyor 92 the softened beans discharge into the feed end of a conventional screw conveyor 100 which conveys the softened beans to flaking or rolling unit 18.

As shown in FIG. 2A, unit 18 includes a flaking cylinder 104 rotably supported by drive roll 108 and back-up rolls 110 and 112. Supported inside cylinder 104 opposite back-up rolls 110 and 112 and in engagement with the inner surface 114 of cylinder 104 is a press or flaking roll 116. This roll is supported on a shaft 118, which is rotated in the direction indicated by arrow 120 by a suitable drive arrangement (not shown).

As shown in FIG. 2A, screw conveyor 100 discharges the moistened, plastic, roasted beans into the nip 122 between flaking cylinder 104 and flaking roll 116. As the soft beans pass through nip 122, they are flattened or rolled into thin wafers, which slide down a chute 124 into the feed end of a screw conveyor 126. Conveyor 126 conducts the wafers to a distribution hopper 132 incorporated in extraction unit 20.

The extraction unit 20 shown in FIG. 2A is of generally conventional construction. This unit includes a plurality of extraction columns 134a–e. The upper ends of the extraction columns are connected to the distribution hopper 132 by conduits 136a–136e and spout 137. Valves 138a–e permit the upper ends of the extraction columns to be isolated from the surrounding environment after they are filled or loaded. The five extraction columns are loaded in turn so that, at a given time, the wafers in columns 134a may have the lowest concentration of coffee solubles, with the concentrations of the solubles in succeeding columns 134b–e being progressively higher.

The solubles are extracted from the wafers in columns 134a–e by pumping hot water upwardly through them, the flow being directed so that the heated water passes first through the column in which the solubles concentration is the lowest, then through the column where the concentration is the next lowest, and finally through the extraction column last filled with roasted beans; i.e., the column in which the concentration of extractable solids in the beans is the highest.

Referring again to FIG. 2A, a certain portion of the extractable solids in the roasted coffee beans will be extracted from them in soaking tank 16. Accordingly, the effluent from this tank is preferably employed as the extraction liquid in unit 20 as this results in retention of the extracted solubles. More specifically, the liquid discharged from tank 16 through conduit 88 and valve 90 flows into a collection tank 140 and is circulated by pump 142 from tank 140 through conduits 144 and 146 into the coil 148 of a shell and tube heat exchanger 150. A heat exchange liquid is circulated through a casing 152 of the heat exchanger to heat the dilute coffee extract in coil 148 to the desired temperature for the extraction step.

Referring again to the drawing, the heated extract flows from heat exchanger 150 through conduit 154 into one of five branch conduits 156a–156e determined by opening one of five valves 158a–e and closing the other four. For the sake of explanation, it will be assumed that the concentration of extractable solids is lowest in extraction column 134a and that the concentration of solids in the beans in columns 134b, 134c, 134d, and 134e is increasingly higher. Accordingly, valves 158b–e are closed and valve 158a opened so that the extraction liquid will first flow upwardly through extraction column 134a. The extraction liquid is discharged from column 134a through discharge conduit 160a, which is connected through a branch conduit 162a to a discharge header 164 and through a branch conduit 166a to extraction column 134b. Flow through one of these two columns is selected by manipulation of valves 168a in branch conduit 162a and 170a in branch conduit 166a. In the hypothetical situation posed in the preceding paragraph, valve 168a is closed and valve 170a opened so that the extraction liquid will flow from column 134a through discharge conduit 160a and through conduit 166a into the lower end of and then upwardly through the bed of beans in extraction column 134b.

Similarly, by proper manipulation of the remaining valves 168b–e and 170b–e, the extraction liquid is caused to flow in turn upwardly through extraction columns 134c, 134d, and 134e. The extraction liquid, by this time at a much higher concentration, is discharged from extraction column 134e through conduit 160e. At this point, the liquid has made a complete pass through the extraction unit. Accordingly, valve 170e is closed and valve 168e is opened so that the brew or extract will flow through branch conduit 162e into header 164 from which it may be pumped for further processing.

When the beans in extraction column 134a are exhausted, i.e., when all of the coffee solubles have been extracted from them, a valve 172a at the bottom end of the extraction column is opened, allowing the exhausted beans to flow through discharge conduit 174a into a screw conveyor 176. This conveyor transfers the exhausted beans from extraction unit 20 to a waste receptacle 178.

Valve 172a is then closed, valve 138a opened, and column 134a charged with beans from hopper 132 through spout 137 and conduit 136a. Valve 138a is closed, and valves 168a–e and 170a–e are readjusted so that the extraction liquid will flow through the columns in the following order: 134b, 134c, 134d, 134e, and 134a. The extract leaving column 134a is diverted from discharge conduit 160a through branch conduit 162a into header 164.

As the beans in each succeeding extraction column become exhausted, they are similarly refilled and valves 160a–e and 170a–e manipulated so that the extracting liquid will flow seriatim through columns in which the concentration of extractable solids is greater.

Figure 2B:
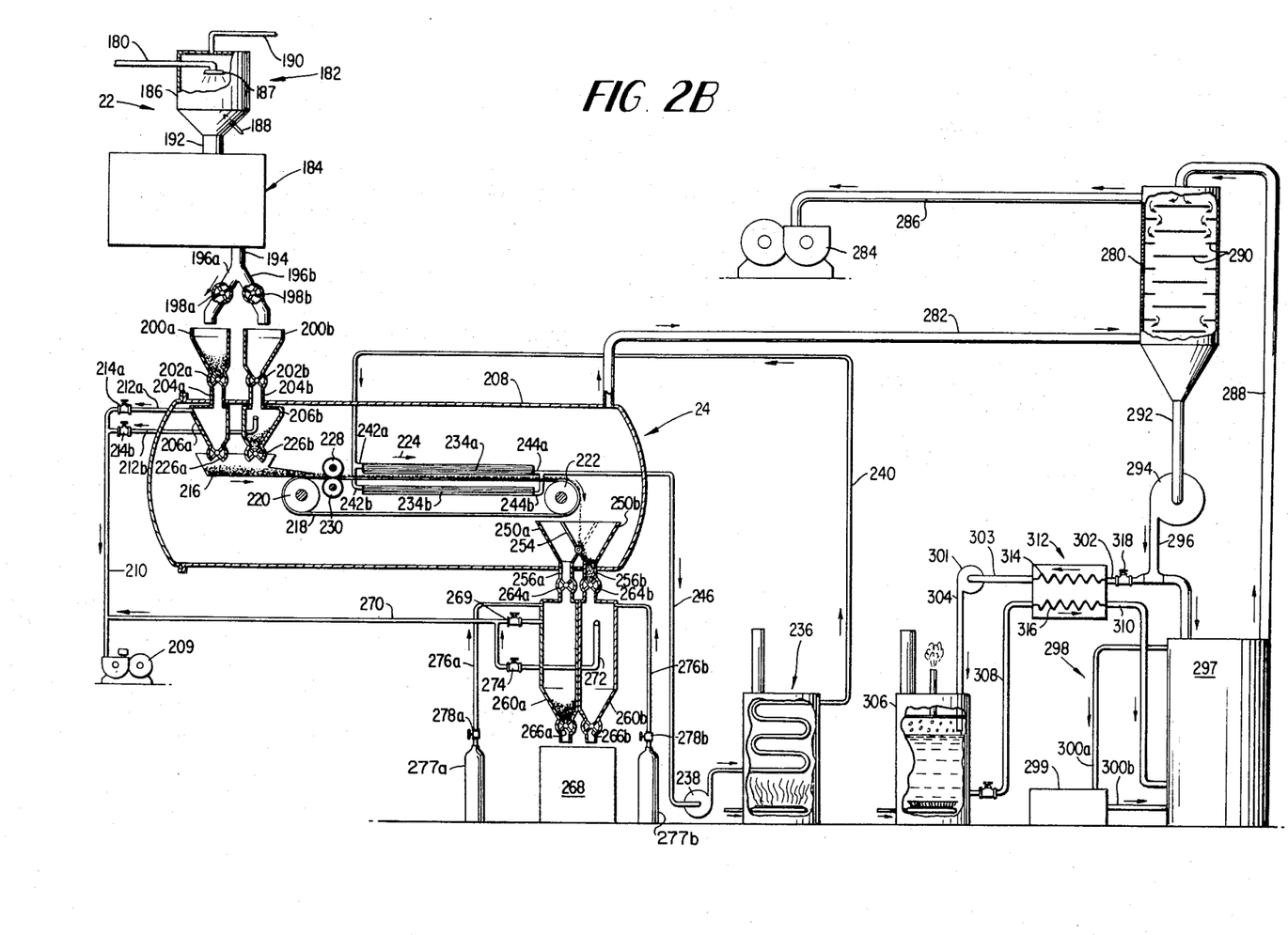

Referring now to FIG. 2B, the extract or brew flows from header 164 through conduit 180 to concentrator 22, which will typically include a freezing unit 182 and a separator unit 184. Freezing unit 182 may be a tank 186 with a spray nozzle 187 in its upper end connected to conduit 180. Extract is sprayed into tank 186 through nozzle 187 and falls downwardly through the tank. As it does so, the particles of spray are frozen by a cold, preferably inert gas flowing upwardly through the vessel from a nozzle 188 to an off-take conduit 190. The frozen particles fall through a transfer conduit 192 into separator 184.

The type of apparatus for converting a liquid to a frozen powder just described is disclosed in detail in my copending application Ser. No. 61,772 filed Aug. 6, 1970 (now U.S. Pat. No. 3,621,582), to which reference may be made, if desired.

The frozen particles falling into separator 184 include particles in which there are no coffee solubles and particles in which such solubles are present in varying proportions. It is the function of separator 184 to remove at least the bulk of the particles in which there are no coffee solubles from the particles in which such solubles are present. Several types of separators, including centrifugal separators, may be employed. Another type of separator, heretofore said to be satisfactory for this purpose, is disclosed in U.S. Pat. No. 3,449,129 issued June 10, 1969, to Reims et al. Other satisfactory separators can be readily selected by those skilled in the arts to which the present invention pertains.

From separator 184, the frozen particulate concentrate flows through a conduit 194 to branch conduits 196a and 196b in which flow controlling valves 198a and 198b are disposed. These valves direct the frozen concentrate from discharge conduit 194 into one of two feed hoppers 200a and 200b. From feed hoppers 200a and 200b the frozen product flows through pocket valves 202a and 202b or similar, essentially gas-tight devices and conduits 204a and 204b into hoppers 206a and 206b in a horizontally elongated vacuum vessel 208.

Hoppers 206a and 206b may be evacuated by a vacuum pump 209 which is connected to the hoppers by a main vacuum line 210 and branch vacuum lines 212a and 212b in which valves 214a and 214b are interposed. Valves 214a and 214b can be closed, allowing hoppers 206a and 206b to be isolated from the ambient atmosphere after they have been evacuated.

Disposed below the outlets of hoppers 206a and 206b is the inlet of a vibrating feeder 216. The vibrating feeder spreads the frozen, particulate product in a thin layer of uniform thickness on the inlet end of a conveyor consisting of a thin, endless belt 218 trained over rolls 220 and 222 located at opposite ends of vacuum vessel 208. Rolls 220 and 222 or both are rotated by an appropriate drive arrangement (not shown) to move the upper leg of belt 218 in the direction indicated by arrow 224 in FIG. 2B.

Hoppers 200a, 206a and 200b, 206b are intended to be alternately employed to maintain a continuous flow of product onto conveyor belt 218. For example, valve 198a is opened to fill hopper 200a with a charge of the frozen, powdered product from separator 184. Valve 198a is then closed and pocket valve 202a operated to transfer the charge through conduit 204a to hopper 206a.

The pocket valve is then closed, isolating hopper 206a from the ambient atmosphere. Valve 214a is then opened, connecting hopper 206a to vacuum pump 209 to evacuate the non-condensible gases from the hopper. This valve is then closed and a pocket valve 226a operated to transfer the charge to vibrating feeder 216. While hopper 206a is being evacuated and emptied, valve 198b is open so that hopper 200b is being filled. Accordingly, there is a continuous transfer of the frozen, powdered extract from separator 184 to the vibrating feeder 216 in vacuum vessel 208.

The product supply arrangement just described is disclosed in detail in my U.S. Pat. No. 3,266,169 for "VACUUM FREEZE DRYING APPARATUS" issued Aug. 16, 1966, to which the reader may refer, if desired.

In instant coffee producing systems in accord with the present invention, it is preferred that a relegation roll arrangement including a pressure roll 228 and a back-up roll 230 be located immediately adjacent the outlet of vibrating feeder 216 to exert pressure on the frozen powder and thereby bind the particles to each other and to the upper surface of conveyor belt 218. This eliminates the problem of particles bouncing or flying off the conveyer and building up inside the vacuum chamber. It also increases the conductivity of the product layer and therefore the rate at which heat is transferred to the center of the layer. Furthermore, the thickness of the product layer is decreased with a consequent increase in the rate at whcih the product can be dried. And the layer of product is compressed to a uniform thickness so that the product is uniformly treated and variations in the dried product minimized or eliminated.

The use of the phenomena of relegation in the manner and for the purposes just described is disclosed in detail in my U.S. Pat. No. 3,324,565, issued June 13, 1967, for "APPARATUS AND METHOD FOR FREEZE DRYING," to which the reader may refer, if desired.

As the frozen product bonded to conveyor belt 218 is carried from relegation rolls 228 and 230 through vacuum vessel 208 toward the end of the conveyor trained over roller 222, it is heated by radiators 234a and b disposed on opposite sides of the upper run of the conveyor. The interior of vacuum vessel 208 is maintained at a pressure below 0.180 inch of mercury absolute, a typical pressure being on the order of 0.012 inch of mercury absolute. At this pressure the water in the product will pass directly from the frozen state to the vapor state, i.e., sublime, when heated to temperatures of −20° F. or higher. Radiators 234a and b supply the heat to raise the temperature of the frozen product to this level.

Radiators 234 are preferably of the circulating liquid type; i.e., a heated, preferably liquid heat transfer medium is circulated through them to increase the temperature of their radiant surfaces. There are several radiators of the circulating liquid type which are suitable for this purpose, including those disclosed in my U.S. Pat. Nos. 3,262,494 issued July 26, 1966; 3,285,514 issued Nov. 15, 1966; and 3,305,011 issued Feb. 21, 1967.

The heat transfer medium circulated to radiators 234a and 234b is heated in any convenient fashion such as in a conventional shell and tube type heater 236. Pump 238 circulates the heated liquid from heater 236 through main supply conduit 240 and branch conduits 242a and 242b to the radiators. After circulating through them, the heat transfer medium flows through branch return conduits 244a and 244b and main return conduit 246 back to heater 236.

The system for heating and circulating the heat transfer medium through radiators 234a and b will in actual practice include a number of additional components, such as controls, etc. as will be apparent to those versed in the arts to which this invention relates. However, as such components are not part of the present invention and as they are described in my U.S. Pat. No. 3,326,292 issued Feb. 22, 1966, and elsewhere, it is not believed necessary to refer to them further herein.

From conveyor belt 218 the dried or dehydrated product flows into one of two discharge hoppers 250a and b, (a doctor blade (not shown) may be employed to scrape the dried material from belt 218). The flow of the dried product is diverted into a selected one of the two hoppers 250a and b by an adjustable feeder vane 254 mounted between the two hoppers.

From hoppers 250a and b the dried product passes through conduits 256a and b into hoppers 260a and b. Valves 264a and b, which may be rotary pocket valves, control the flow of the dried product between hoppers 250a and 260a and between hoppers 250b and 260b and seal the lower ends of hoppers 260a and b from the ambient atmosphere. From hoppers 260a and b the dried product flows through pocket valves 266a and b or the like into container 268, for example.

The two discharge hopper arrangements 250a, 260a and 250b, 260b are intended to be employed alternately. Thus, with hopper 250a full and the dried product flowing from conveyor belt 218 into hopper 250b, hopper 260a is evacuated by opening a valve 269 interposed in a vacuum line 270 connecting hopper 260a to vacuum pump 209 (hopper 260b can be evacuated through a line 272 between the hopper and line 270 in which a valve 274 is interposed). Valve 269 is then closed, sealing hopper 260a from the ambient atmosphere, and valve 264a is operated, allowing dried product in hopper 250a to flow into hopper 260a. Operation of pocket valve 264a then transfers the product into container 268.

Hopper 260a is also connected by a supply line or conduit 276a to a bottle 277a (or other source) of nitrogen or other dry, inert gas which will not oxidize or introduce water vapor into the dried product. After hopper outlet valve 264a is operated, a valve 278a in nitrogen supply line 276a is opened, allowing the nitrogen to flow into hopper 260a and break the vacuum therein so that the hopper contents will flow freely into container 268. A similar vacuum breaking arrangement identified by identical reference characters followed by the letter b is provided for hopper 260b.

After hopper 250a is filled, adjustable feeder vane 254 is moved to the position shown in dotted lines and the dried product discharged from conveyor belt 218 into hopper 250b. Then, in the manner described above in conjuction with hopper arrangement 250a, 260a, the product in hopper 250b is discharged through valve 264b, hopper 260b, and valve 266b into container 268.

It is necessary for satisfactory operation to continuously remove the evaporated water from the vacuum vessel 208 since, at 0.0126 in. Hg abs. pressure and −20° F., for example, each pound of water removed from the product occupies several thousand cubic feet. The exemplary system employed in the apparatus of FIG. 1 for this purpose includes a condenser 280 connected to vacuum vessel 208 by a conduit 282 and to a vacuum pump 284 by a conduit 286. Vacuum pump 284, which is used to pump down vacuum vessel 208 when the system is started up, draws the accumulated water vapor from the vacuum vessel through conduit 282 and upwardly through condenser 280 where it is absorbed by a refrigerated solution of an absorbent liquid such as lithium chloride. The sorbent is pumped through a conduit 288 into the upper end of condenser 280 and flows downwardly through the condenser over interleaved horizontal baffles 290. Vacuum pump 284 also evacuates non-condensable gases from vacuum vessel 208 and condenser 280.

From the lower end of condenser 280, the lithium chloride solution, heated and diluted by absorbed water vapor, flows through a conduit 292 into circulating pump 294 which pumps it through conduit 296 into the tank 297 of any appropriate type of refrigeration apparatus 298, which will also typically include a refrigeration unit 299 connected to tank 297 by conduits 300a and b through which the sorbent is circulated to reduce its temperature. Chiller 298 refrigerates the concentrated lithium chloride solution for recirculation to condenser 280.

A second, small circulating pump 301 continuously draws a portion of the diluted solution from conduit 296 through conduits 302, 303, and 304 into a conventional reboiler 306. From reboiler 306 the concentrated sorbent flows through conduits 308 and 310 back into tank 297 for cooling and recirculation to condenser 280.

As shown in FIG. 2B, a heat exchanger 312 including coils 314 and 316 disposed in heat exchange relationship is also included in the sorbent system. Coil 314 is connected between conduits 302 and 303, and coil 316 is connected between conduits 308 and 310. Consequently, the relatively hot sorbent discharge from reboiler 306 heats the relatively cool sorbent flowing to the reboiler. Accordingly, the hot, concentrated sorbent gives up heat to the dilute sorbent, transferring to the latter and thereby conserving sensible heat which would otherwise be rejected and wasted in refrigeration system 298.

A valve 318 is interposed in conduit 302. This valve controls the flow of sorbent to reboiler 306 and, accordingly, the concentration of the sorbent supplied to condenser 280.

Figure 3:
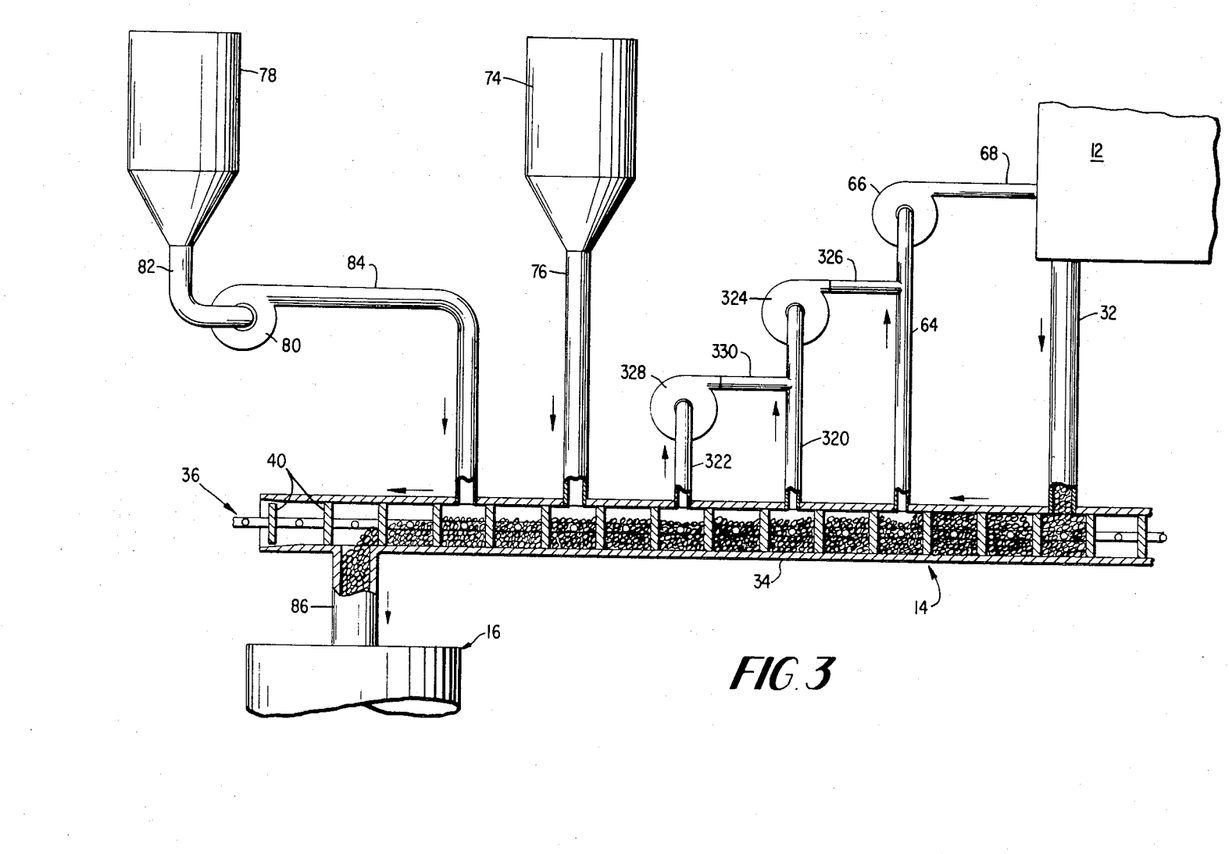
FIG. 3 is a generally diagrammatic illustration of an alternate arrangement for removing gases from beans roasted in a system as shown in FIG. 1 before the beans are further processed.

In a typical application of the present invention, the pressure in roaster vessel 12 and therefore on the beans in the cylinder 34 of unit 14 may be on the order of 140 psi. To reduce this pressure to one of a fraction of an inch of mercury by a single pump, as in the embodiment of the invention shown in FIGS. 2A and 2B, may be impractical from an economic point-of-view. In this case, the pressure can be reduced in steps or stages as shown in FIG. 3. More specifically, as shown in the latter figure, vacuum lines 320 and 322 (the number may be increased or decreased as desired) communicate with the interior of casing 34 to locations spaced in the direction of movement of endless member 36 from gas conduit line 64. A pump 324 evacuates gases from cylinder 34 through vacuum line 320 and conduit 326 into conduit 64 to provide a second stage of pressure reduction. A third pump 328 provides a third stage of pressure reduction by evacuating the gases through conduits 322 and 330 into vacuum line 320.

The extent to which the pressure is reduced in each stage will of course vary from application-to-application. However, in a typical application, the pressure on the beans may be reduced from roasting pressure to atmospheric by pump 66, from atmospheric to on the order of 2.0 inches of mercury absolute by pump 324, and to on the order of 0.1–0.2 inches of mercury absolute by pump 328. The gases discharged from pumps 324 and 328 can be exhausted to atmosphere. However, the illustrated arrangement is preferred since this results in all of the roasting gases being returned to roasting vessel 12.

Many other modifications designed to accommodate the needs of particular applications may of course be made in the exemplary systems described above. To the extent that these and other physical embodiments of the principles of the present invention are not expressly included in the appended claims, they are fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing a soluble coffee concentrate, which comprises: means including a roasting vessel for roasting green coffee beans; an elongated conduit; an endless member extending through said conduit; a plurality of pistons fixed to said endless member in spaced apart relationship, said pistons being sealingly engageable with the inner wall of said conduit; means for advancing said endless member to thereby move said pistons through said conduit; means for transferring the roasted beans from the roasting vessel to said elongated conduit intermediate the ends thereof; means for removing absorbed gases from said beans and returning them to said roasting vessel comprising a conduit means communicating at one end with the interior of said elongated conduit at a location spaced in the direction of movement of the endless member from the location at which the roasted beans are transferred into said elongated conduit and means interposed in said conduit means for pumping absorbed gases from said elongated conduit to said roasting vessel; means for flooding with and soaking in water the beans from which the gases have been removed to facilitate a subsequent reduction in thickness of said beans; means for reducing the thickness of the roasted beans to thereby facilitate the extraction of coffee solubles from said beans; means for contacting the reduced thickness beans with heated water to extract the solubles therefrom; means for concentrating the solution of extracted solubles; means for reducing the concentrate to a frozen particulate form; and means for freeze drying the solubles in the particles of frozen concentrate.

2. The apparatus of claim 1, wherein the means for pumping absorbed gases from said elongated conduit into said roasting vessel comprises a second conduit means having one end thereof communicating with the first-mentioned conduit means, the other end of said second conduit means communicating with the interior of the elongated conduit at a location spaced in the direction of movement of the endless member from the first-mentioned conduit means, and means interposed in said second conduit means for pumping gases from said elongated conduit through the second conduit means into the first-mentioned conduit means.

3. The apparatus of claim 1, together with a vacuum line communicating with the interior of the elongated conduit at a location spaced in a direction opposite to that of the movement of the endless member from said conduit means and means for evacuating said elongated conduit through said vacuum line.

4. The apparatus of claim 2, wherein the means for flooding the roasted beans comprises a source of water and a water line connected between said source and the interior of the elongated conduit, said water line communicating with the interior of the elongated conduit at a location spaced in the direction of movement of said endless member from the location at which said conduit means communicates with said elongated conduit.

5. The apparatus of claim 4, wherein the means for flooding the beans further comprises means including a line communicating with the interior of the elongated conduit at a location spaced in the direction of movement of the endless member from the location at which the first-mentioned water line communicates with the interior of the elongated conduit and means for forcing water under pressure from said line into said elongated conduit.

6. Apparatus for producing a soluble coffee concentrate, which comprises: means comprising a roasting vessel for roasting green coffee beans; means for removing absorbed gases from the roasted beans; means for returning the gases removed from the beans to the roasting vessel; means for flooding the beans from which the absorbed gases have been removed with and soaking them in water to soften the beans; means for reducing the thickness of the roasted and softened beans to thereby facilitate the extraction of coffee solubles from said beans; an extractor in which a bed of the reduced thickness beans can be formed; means for so circulating heated water through said extractor as to contact the beans in the bed with said water and extract the solubles therefrom; means for concentrating the solution of extracted solubles; means for reducing the concentrate to a frozen particulate form; and means for freeze drying the solubles in the particles of frozen concentrate.

7. Apparatus for producing a soluble coffee concentrate, which comprises: means for roasting green coffee beans; means for removing absorbed gases from the roasted beans; means for thereafter flooding said beans with and soaking them in water to soften the beans; means for reducing the thickness of the roasted and softened beans to thereby facilitate the extraction of coffee solubles from said beans; means for contacting the reduced thickness beans with heated water to extract the solubles therefrom which comprises at least one extraction column and means for effecting a flow of the water in which the roasted beans are soaked through said extraction column to thereby recover from said water solubles extracted from the beans as they soak; means for concentrating the solution of extracted solubles; means for reducing the concentrate to a frozen particulate form; and means for freeze drying the solubles in the particles of frozen concentrate.

8. Apparatus for producing a soluble coffee concentrate in a continuous as opposed to batch-type manner, which comprises: means for roasting green coffee beans; a means through which roasted beans can move in a continuous fashion for contacting the roasted beans with a liquid to soften and increase the plasticity of said beans; a pair of relatively movable members; means for passing the whole softened beans between said members to flatten said beans into wafers; an extractor in which a bed of the wafers can be formed; means for so circulating heated water through said extractor as to contact the wafers with said water and extract the solubles therefrom; means for concentrating the extract; means for reducing the concentrate to a frozen particulate form; and means for freeze drying the solubles in the particles of frozen concentrate.

9. Apparatus for producing a soluble coffee concentrate, which comprises: means for roasting green coffee beans; means for evacuating absorbed gases from the roasted beans; means for thereafter flooding said beans with and soaking them in water to soften the beans; means for reducing the thickness of the roasted and softened beans to thereby facilitate the extraction of coffee solubles from said beans; an extractor in which a bed of the reduced thickness beans can be formed; means for so circulating heated water through said extractor as to contact the beans in the bed with said water and extract the solubles therefrom; means for concentrating the solution of extracted solubles; means for reducing the concentrate to a frozen particulate form; and means for freeze drying the solubles in the particles of frozen concentrate.

10. Apparatus for producing a soluble coffee concentrate, which comprises: means for roasting green coffee beans including a roasting vessel; means for removing absorbed gases from the roasted beans and returning said gases to the roasting vessel; means for thereafter flooding said beans with and soaking them in water to soften the beans; means for reducing the thickness of the roasted and softened beans to thereby facilitate the extraction of coffee solubles from said beans; means for contacting the reduced thickness beans with heated water to extract the solubles therefrom comprising a plurality of extraction columns, means for successively loading different ones of said columns with the soaked, reduced thickness coffee beans, and means for so effecting a flow of water through said columns that it flows first through the first-loaded column and then seriatim through the remaining columns in the order in which they are loaded, the last-mentioned means including means for effecting a flow of the water in which the roasted beans are soaked through said extraction columns to thereby recover from said water solubles extracted from the beans as they soak; means for concentrating the solution of extracted solubles; means for reducing the concentrate to a frozen particulate form; and means for freeze drying the solubles in the particles of frozen concentrate.

* * * * *

UNITED STATES PATENT OFFICE
CERTIFICATE OF CORRECTION

Patent No. 3,799,049  Dated March 26, 1974

Inventor(s) Horace L. Smith, Jr.

It is certified that error appears in the above-identified patent and that said Letters Patent are hereby corrected as shown below:

Column 3, line 16, change "thp" to --the--.

Column 6, line 37, change "3,621,582" to --3,621,587--.

Column 7, line 51, change "whcih" to --which--.

Column 10, line 16, change "to" to --at--.

Signed and sealed this 6th day of August 1974.

(SEAL)
Attest:

McCOY M. GIBSON, JR.
Attesting Officer

C. MARSHALL DANN
Commissioner of Patents